(12) United States Patent  (10) Patent No.: US 7,476,015 B2
Arai et al.  (45) Date of Patent: Jan. 13, 2009

(54) BACKLIGHT APPARATUS AND LIQUID CRYSTAL DISPLAY APPARATUS

(75) Inventors: Takeo Arai, Saitama (JP); Masato Hatanaka, Saitama (JP)

(73) Assignee: Sony Corporation, Tokyo (JP)

(*) Notice: Subject to any disclaimer, the term of this patent is extended or adjusted under 35 U.S.C. 154(b) by 642 days.

(21) Appl. No.: 11/119,269

(22) Filed: Apr. 30, 2005

(65) Prior Publication Data

US 2005/0259441 A1  Nov. 24, 2005

(30) Foreign Application Priority Data

May 19, 2004  (JP)  ............................. 2004-149681

(51) Int. Cl.
F21V 9/08  (2006.01)
F21V 7/04  (2006.01)

(52) U.S. Cl. ........................ 362/607; 362/608; 362/613; 362/555; 362/293; 349/65

(58) Field of Classification Search ................. 362/600, 362/608, 612, 613, 621, 622, 634, 231, 235, 362/227, 800, 293, 16, 607, 555, 240; 349/65
See application file for complete search history.

(56) References Cited

U.S. PATENT DOCUMENTS

| | | | | |
|---|---|---|---|---|
| 4,071,809 | A * | 1/1978 | Weiss et al. ................... | 315/312 |
| 5,842,765 | A * | 12/1998 | Cassarly et al. ............... | 362/21 |
| 5,985,696 | A | 11/1999 | Brunner et al. | |
| 6,139,166 | A * | 10/2000 | Marshall et al. ............. | 362/231 |
| 6,464,366 | B1 * | 10/2002 | Lin et al. ..................... | 362/616 |
| 2001/0007527 | A1 * | 7/2001 | Lammers et al. ............ | 362/294 |
| 2001/0049893 | A1 * | 12/2001 | Maas et al. ................... | 40/544 |
| 2003/0076669 | A1 * | 4/2003 | Itoh et al. ..................... | 362/31 |
| 2005/0007753 | A1 * | 1/2005 | Van Hees et al. ............. | 362/31 |

(Continued)

FOREIGN PATENT DOCUMENTS

JP  63-023710  8/1989

(Continued)

OTHER PUBLICATIONS

Japanese Office Action issued Nov. 27, 2007 in connection with Japanese Patent Application No. 2004-149681, Japanese Patent Office.

*Primary Examiner*—Ismael Negron
(74) *Attorney, Agent, or Firm*—Sonnenschein Nath & Rosenthal LLP

(57) ABSTRACT

A low-profile edge-lit backlight apparatus includes a light guiding plate which guides light introduced from a side by utilizing total reflection on a light emitting surface as one principal surface and a light reflecting surface as the other principal surface and emits light from the light emitting surface based on surface emitting, and a plurality of white light emission units that emit white light incident on the light guiding plate. The white light emission section includes a light source group of a first light emitting diode to emit first primary color light, a second light emitting diode to emit second primary color light, and a third light emitting diode to emit third primary color light which are arranged in a row, and a color mixing section that generates white light by mixing the first primary color light, the second primary color light, and the third primary color light.

14 Claims, 14 Drawing Sheets

U.S. PATENT DOCUMENTS

2005/0190562 A1 * 9/2005 Keuper et al. ............... 362/325

FOREIGN PATENT DOCUMENTS

| JP | 10-021722 | 8/1999 |
| JP | 2002-133932 | 5/2002 |
| JP | 2003-195302 | 7/2003 |
| JP | 2002-093211 | 10/2003 |
| JP | 11-511596 | 3/2008 |

* cited by examiner

BACKLIGHT APPARATUS AND LIQUID CRYSTAL DISPLAY APPARATUS

CROSS REFERENCE TO RELATED APPLICATIONS

The present invention contains subject matter related to Japanese Patent Application JP 2004-149681 filed in the Japanese Patent Office on May 19, 2004, the entire contents of which being incorporated herein by reference.

FIELD OF THE INVENTION

The present invention relates to a backlight apparatus and a liquid crystal display apparatus. More specifically, the present invention relates to a backlight apparatus using a light emitting diode and a liquid crystal display apparatus which illuminates a liquid crystal panel by means of the backlight apparatus using the light emitting diode to exhibit video displayed on the liquid crystal panel.

DESCRIPTION OF THE RELATED ART

A liquid crystal display apparatus is equipped with a backlight apparatus at the rear of a liquid crystal panel to display video. The backlight apparatus illuminates the liquid crystal panel from the rear to clearly show video displayed on the liquid crystal panel. The backlight apparatus causes surface emitting to the light radiated from a light source using a diffusion sheet to illuminate the entire liquid crystal panel.

The light source uses a fluorescent tube, an LED (light emitting diode), and the like. In particular, the LED is often used as the light source for the backlight apparatus to illuminate small liquid crystal panels mounted on PDA (Personal Digital Assistants), digital cameras, and the other small electronic devices.

Fluorescent tubes such as cold cathode fluorescent lamps are used as a light source for the backlight apparatus that illuminates large liquid crystal panels mounted on large electronic devices such as PCs (personal computers) and television sets. However, a cold cathode fluorescent lamp uses mercury. When the cold cathode fluorescent lamp is broken, for example, the mercury outpours to cause the possibility of adversely affecting the environment.

In consideration for this, it is proposed to use an LED as the light source for backlight apparatuses that illuminate large liquid crystal panels mounted on large electronic devices.

The backlight apparatus is requested to illuminate liquid crystal panels by radiating white light. A white LED to radiate white light generates white light by applying fluorescent material to a blue LED. However, the luminous efficiency is very low, i.e., approximately ⅙ to 1/10 of cold cathode fluorescent lamps. It is easy to use the white LED as the light source for backlight apparatuses illuminating small liquid crystal panels. However, it is difficult to use the white LED as the light source for backlight apparatuses illuminating large liquid crystal panels.

There is proposed the technique to generate white light by using LEDs emitting three primary colors of light, i.e., red, green, and blue lights as the light source and mixing red, green, and blue lights radiated from the respective LEDs. Since the LEDs respectively emitting red, green, and blue lights are used as the light source, it is possible to ensure sufficient brightness and prevent the luminous efficiency from degrading compared to the white LED.

Backlight apparatuses include a direct backlight apparatus and an edge-lit backlight apparatus. The direct backlight apparatus has a light source provided opposite to the rear of the liquid crystal panel. The edge-lit backlight apparatus is provided with a flat light guiding plate at the rear of the liquid crystal panel. The light guiding plate has almost the same size as the liquid crystal panel. Light radiated from the light source enters the side of the light guiding plate and is emitted from a surface opposite to the light guiding plate' liquid crystal panel in the manner of surface emitting.

As shown in FIG. 1, an edge-lit backlight apparatus 300 using LEDs comprises the following components. A light guiding plate 301 has a light incident surface 301a at one edge in the width direction, a light emitting surface 301b at one principal surface, and a light reflecting surface 301c at the other principal surface. A light guiding path 302 is arranged so that its one principal surface is in contact with the light reflecting surface 301c of the light guiding plate 301. A reflection path 303 connects one edge of the light guiding path 302 with the light incident surface of the light guiding plate 301. A red light emitting diode (hereafter referred to as LED) 304R, a green LED 304G, and a blue LED 304B are provided on the other edge of the light guiding path 302. A diffusion sheet 305, a first lens sheet 306, and a second lens sheet 307 are sequentially layered on the light emitting surface 301b of the light-guiding plate 301.

For simplicity, FIG. 1 shows only one red LED 304R, one green LED 304G, and one blue LED 304B. Actually, there is provided a plurality of red LEDs 304R, green LEDs 304G, and blue LEDs 304B. When no distinction is needed, the red LED 304R, the green LED 304G, and the blue LED 304B are generically referred to as a LED 304.

The red LED 304R emits red light Lr. The green LED 304G emits green light Lg. The blue LED 304B emits blue light Lb. The red light Lr, the green light Lg, and the blue light Lb are emitted from the LEDs 304, pass through the light guiding path 302 and the reflection path 303, and are naturally mixed to be white light. The white light then enters the light guiding plate 301. The light guiding path 302 and the reflection path 303 are provided to ensure a space needed to naturally mix the red light Lr emitted from the red LED 304R, the green light Lg emitted from the green LED 304G, and the blue light Lb emitted from the blue LED 304B.

FIG. 2 shows a cross sectional view taken along lines A-A of FIG. 1. As shown in FIG. 2, the space needed to naturally mix the red light Lr, the green light Lg, and the blue light Lb is configured by appropriately designing width W of the light guiding path 302 and radius R of the reflection path 303. Materials forming the light guiding path 302 and the reflection path 303 have refractive indexes needed to efficiently guide the incident light to the light guiding plate 301.

The white light incident on the light guiding plate 301 is guided by means of total reflection inside the light guiding plate 301. A prism pattern or a dot pattern is formed on the light reflecting surface 301c of the light guiding plate 301 so as to efficiently orient the incident light. These patterns allow the light to enter the inside of the light emitting surface 301b at an angle smaller than the critical angle and to be emitted from the light emitting surface 301b.

The diffusion sheet 305 uniforms the in-plane light-scattering of the light emitted from the light emitting surface 301b. The light then enters the first lens sheet 306 and the second lens sheet 307 and is deflected to converge perpendicularly to the light emitting surface 301b.

In this manner, the light is emitted from the light emitting surface 301b of the light guiding plate 301. The emitted light passes through the diffusion sheet 305 and enters the first lens sheet 306 and the second lens sheet 307. This makes it possible to efficiently improve the front brightness of the backlight apparatus 300.

[Patent Document 1] Jpn. Utility Model Appln. Publication No. 7-36347

[Patent Document 2] PCT Pat. Appln. Laid-Open Publication No. 2002-54048

SUMMARY OF THE INVENTION

The above-mentioned backlight apparatus 300 is provided with as many red LEDs 304R, green LEDs 304G, and blue LEDs 304B as fit to the other edge of the light guiding path 302, i.e., as fit to the size of the light incident surface 301a of the light guiding plate 301.

The backlight apparatus 300 limits the number of LEDs 304 to be used in accordance with the size of the light incident surface 301a and therefore limits the amount of radiable light. It is difficult to emit the amount of light needed to illuminate large liquid crystal panels such as 23-inch ones.

The backlight apparatus 300 uses the reflection path 303 and the light guiding path 302 that are needed to mix red, green, and blue lights emitted from the LEDs 304. The reflection path 303 and the light guiding path 302 are arranged along the direction that increases the thickness of the light guiding plate 301.

When such backlight apparatus 300 is mounted on the liquid crystal panel 308 to construct the liquid crystal display apparatus, the liquid crystal display apparatus becomes very thick.

The present invention has been made in consideration of the foregoing. It is desirable to provide a light guiding plate type, low-profile backlight apparatus which uses light emitting diodes to emit red, green, and blue lights as light sources and emits white light having sufficient brightness and high color purity generated by mixing red, green, and blue lights emitted from the light emitting diodes. It is also desirable to provide a low-profile liquid crystal display apparatus using such backlight apparatus.

A backlight apparatus according to the present invention comprises: a light guiding plate which guides light introduced from a side by means of total reflection on a light emitting surface as one principal surface and a light reflecting surface as the other principal surface and emits light from the light emitting surface based on surface emitting; and a plurality of white light emission means for emitting white light incident on the light guiding plate, wherein the white light emission means includes: a light source group of a first light emitting diode to emit first primary color light, a second light emitting diode to emit second primary color light, and a third light emitting diode to emit third primary color light which are arranged in a row; and a color mixing means for generating white light by mixing the first primary color light emitted from the first light emitting diode, the second primary color light emitted from the second light emitting diode, and the third primary color light emitted from the third light emitting diode; and a white light incidence means for directing white light generated by the color mixing means from a side of the light guiding plate, and on the light guiding plate's side, the first light emitting diode, the second light emitting diode, and the third light emitting diode are arranged so as to be perpendicular to the light guiding plate's principal surface.

A liquid crystal display apparatus according to the present invention comprises a transitive liquid crystal panel and a backlight apparatus to illuminate this liquid crystal panel from one principal surface, wherein the backlight apparatus comprises: a light guiding plate which guides light introduced from a side by means of total reflection on a light emitting surface as one principal surface and a light reflecting surface as the other principal surface and emits light from the light emitting surface based on surface emitting; and a plurality of white light emission means for emitting white light incident on the light guiding plate, wherein the white light emission means includes: a light source group of a first light emitting diode to emit first primary color light, a second light emitting diode to emit second primary color light, and a third light emitting diode to emit third primary color light which are arranged in a row; and a color mixing means for generating white light by mixing the first primary color light emitted from the first light emitting diode, the second primary color light emitted from the second light emitting diode, and the third primary color light emitted from the third light emitting diode; and a white light incidence means for directing white light generated by the color mixing means from a side of the light guiding plate, and on the light guiding plate's side, the first light emitting diode, the second light emitting diode, and the third light emitting diode are arranged so as to be perpendicular to the light guiding plate's principal surface.

The backlight apparatus and the liquid crystal display apparatus according to the present invention use first, second, and third light emitting diodes arranged on a side of a specifically sized light guiding plate and are characterized by the number of these light emitting diodes three times as many as equivalent light emitting diodes arranged in a row. Accordingly, it is possible to make a large amount of white light having high color purity incident on the light guiding plate from the side. Since it is possible to make a large amount of white light having high color purity incident on the light guiding plate, the backlight apparatus according to the present invention is provided as an edge-lit backlight apparatus using light emitting diodes as a light source and can illuminate a liquid crystal panel by emitting the light having sufficient brightness and high color purity.

In the backlight apparatus according to the present invention, the color mixing means provided for the white light emission means mixes red, green, and blue lights to generate white light which is then incident on the light guiding plate. Since there is no need for a space to mix red, green, and blue lights, the backlight apparatus can be designed to have a low profile.

The backlight apparatus according to the present invention uses the light emitting diode as a light source, and therefore promotes safety and decreases adverse effects on the environment.

The low-profile edge-lit backlight apparatus emits white light that results from mixing first primary color light, second primary color light, and third primary color light and exhibits sufficient brightness and high color purity. The liquid crystal display apparatus according to the present invention uses such backlight apparatus to illuminate the liquid crystal display panel. Accordingly, the liquid crystal display apparatus according to the present invention can have a low profile and clearly represent video displayed on the liquid crystal display panel.

The liquid crystal display apparatus according to the present invention is equipped with the backlight apparatus using the light emitting diodes as the light source, and therefore promotes safety and decreases adverse effects on the environment.

BRIEF DESCRIPTION OF THE DRAWINGS

FIG. 10 is a pattern diagram illustrating that a large interval between light source cells causes the light guiding plate to contain a region where no white light passes through;

DETAILED DESCRIPTION OF THE PREFERRED EMBODIMENTS

The best mode for carrying out the invention will be described in further detail with reference to the accompanying drawings.

Figure 1:
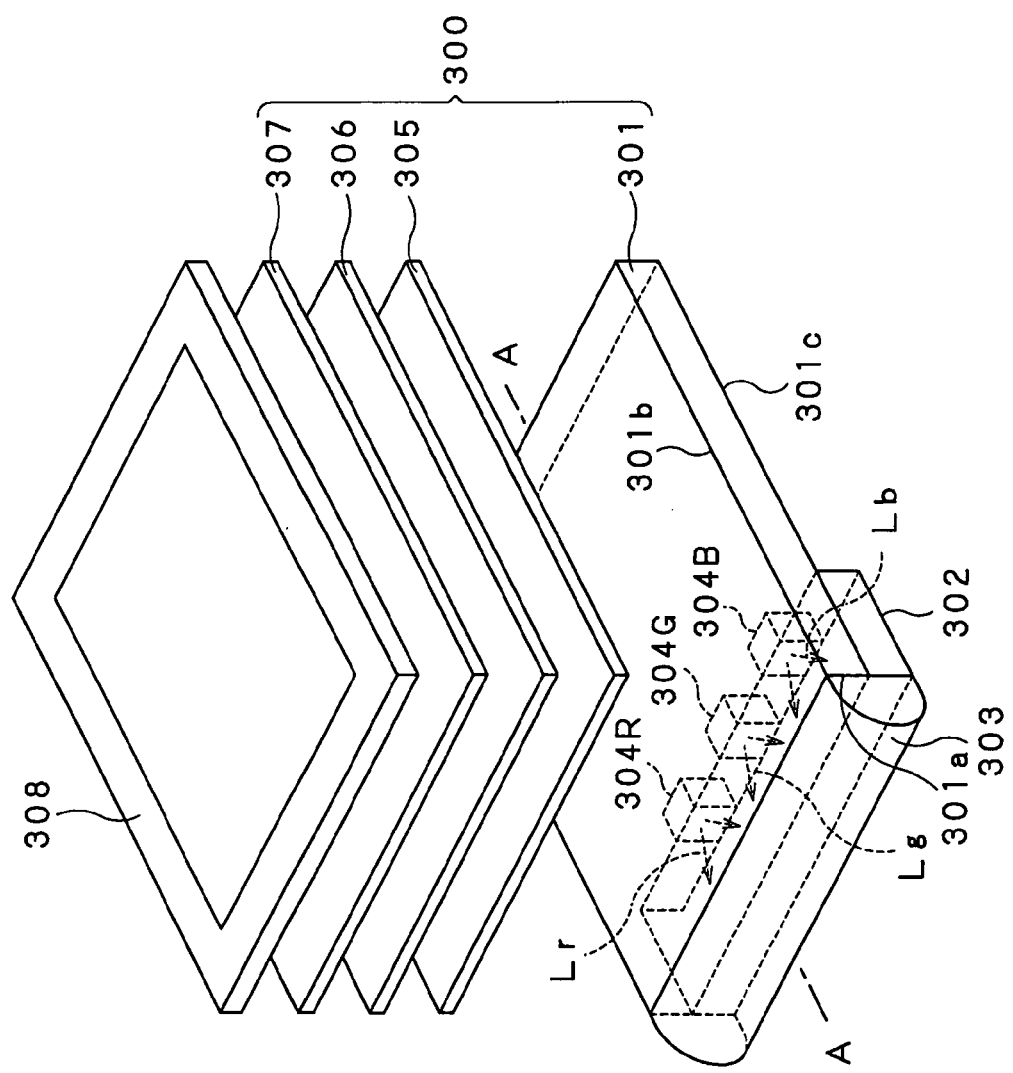
FIG. 1 is a plan view showing a conventional edge-lit backlight apparatus.
Figure 2:
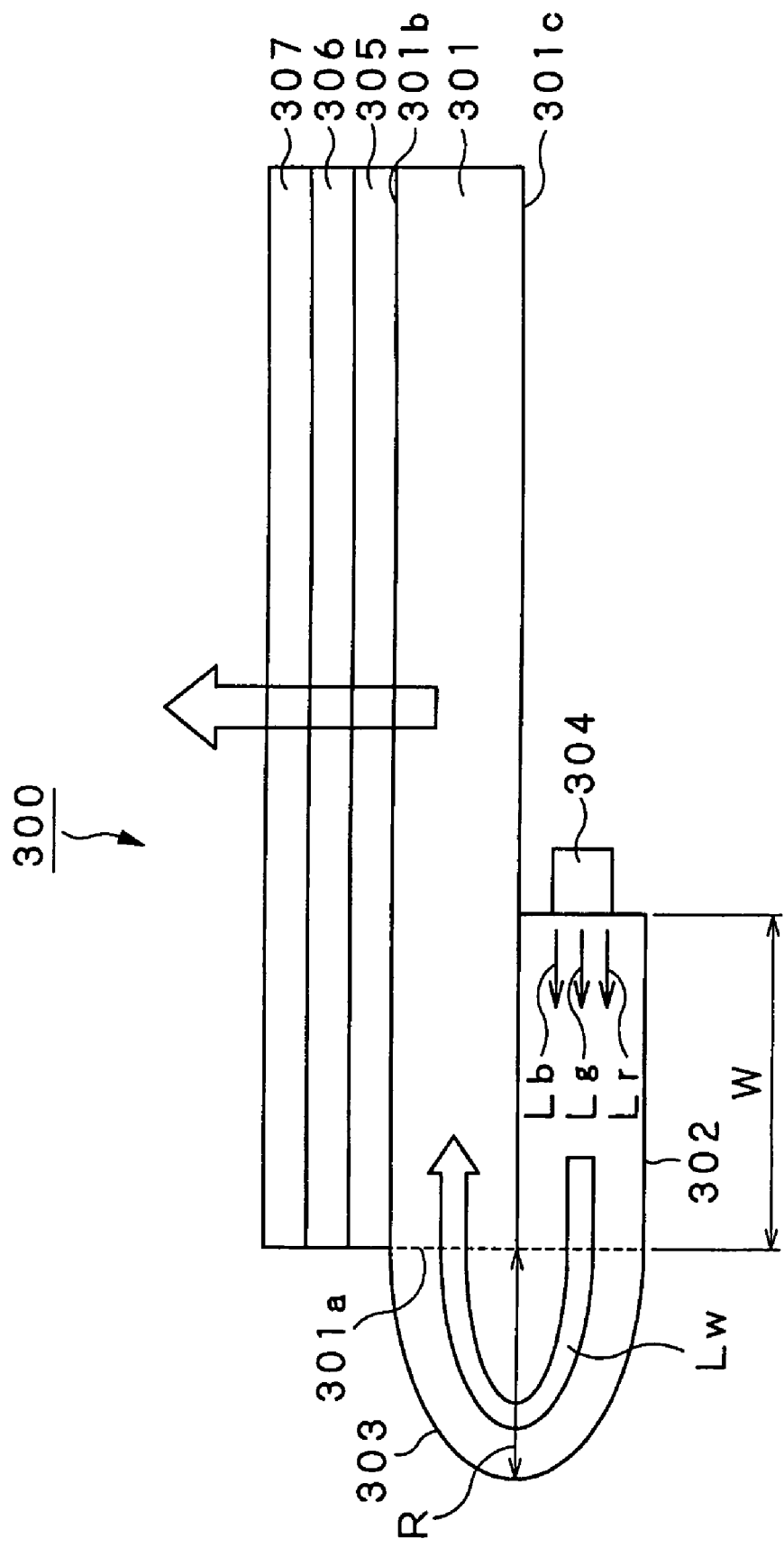
FIG. 2 is a sectional view showing the conventional edge-lit backlight apparatus.
Figure 3:
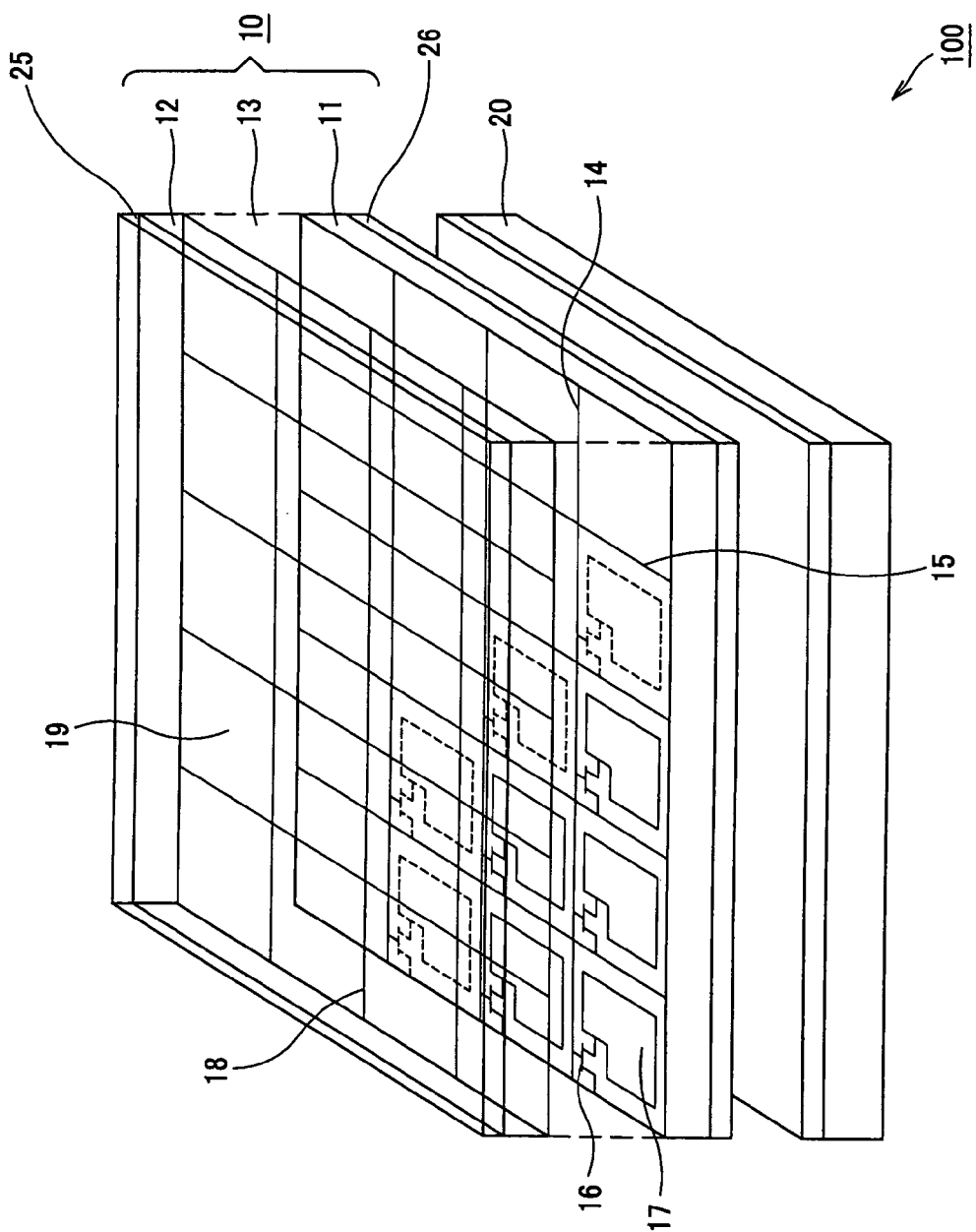
FIG. 3 is a schematic perspective view showing the configuration of a liquid crystal display apparatus according to the present invention.

The present invention is applied to a backlight liquid crystal display apparatus 100 as shown in FIG. 3, for example. According to the embodiment, the liquid crystal display apparatus 100 has an aspect ratio of 9:16, or the 23-inch size.

The liquid crystal display apparatus 100 includes a transmissive liquid crystal display panel 10 and a backlight apparatus 20 provided on one principal surface side (hereafter referred to as a rear side) of the liquid crystal display panel 10. A user can view video on the liquid crystal display panel 10 from the other principal surface side (hereafter referred to as a front side).

The liquid crystal display panel 10 comprises a TFT substrate 11, a counter electrode substrate 12, and a liquid crystal layer 13. The TFT substrate 11 and the counter electrode substrate 12 are made of glass, for example, and are arranged so as to face to each other. The liquid crystal layer 13 contains twisted nematic liquid crystal and is placed between the TFT substrate 11 and the counter electrode substrate 12.

Signal lines 14 and scan lines 15 are formed in a matrix on the TFT substrate 11. Further, thin-film transistors 16 and pixel electrodes 17 are formed as switching elements on the TFT substrate 11 at intersecting points between the signal lines 14 and the scan lines 15. The scan lines 15 successively select the thin-film transistors 16. The thin-film transistor 16 writes a video signal supplied from the signal line 14 to the corresponding pixel electrode 17.

A counter electrode 18 and a color filter 19 are formed in the inside surface of the counter electrode substrate 12. The liquid crystal display panel 10 is assumed to have the rear side provided with the TFT substrate 11 and the front side provided with the counter electrode substrate 12.

The liquid crystal display apparatus 100 contains the liquid crystal display panel 10 having the above-mentioned configuration. The liquid crystal display panel 10 is sandwiched between the two deflecting plates 25 and 26. While the backlight apparatus 20 radiates white light from the rear side, the liquid crystal display apparatus 100 is driven based on the active matrix technology to provide intended full-color video display. The backlight apparatus 20 will be described later in detail.

Figure 4:
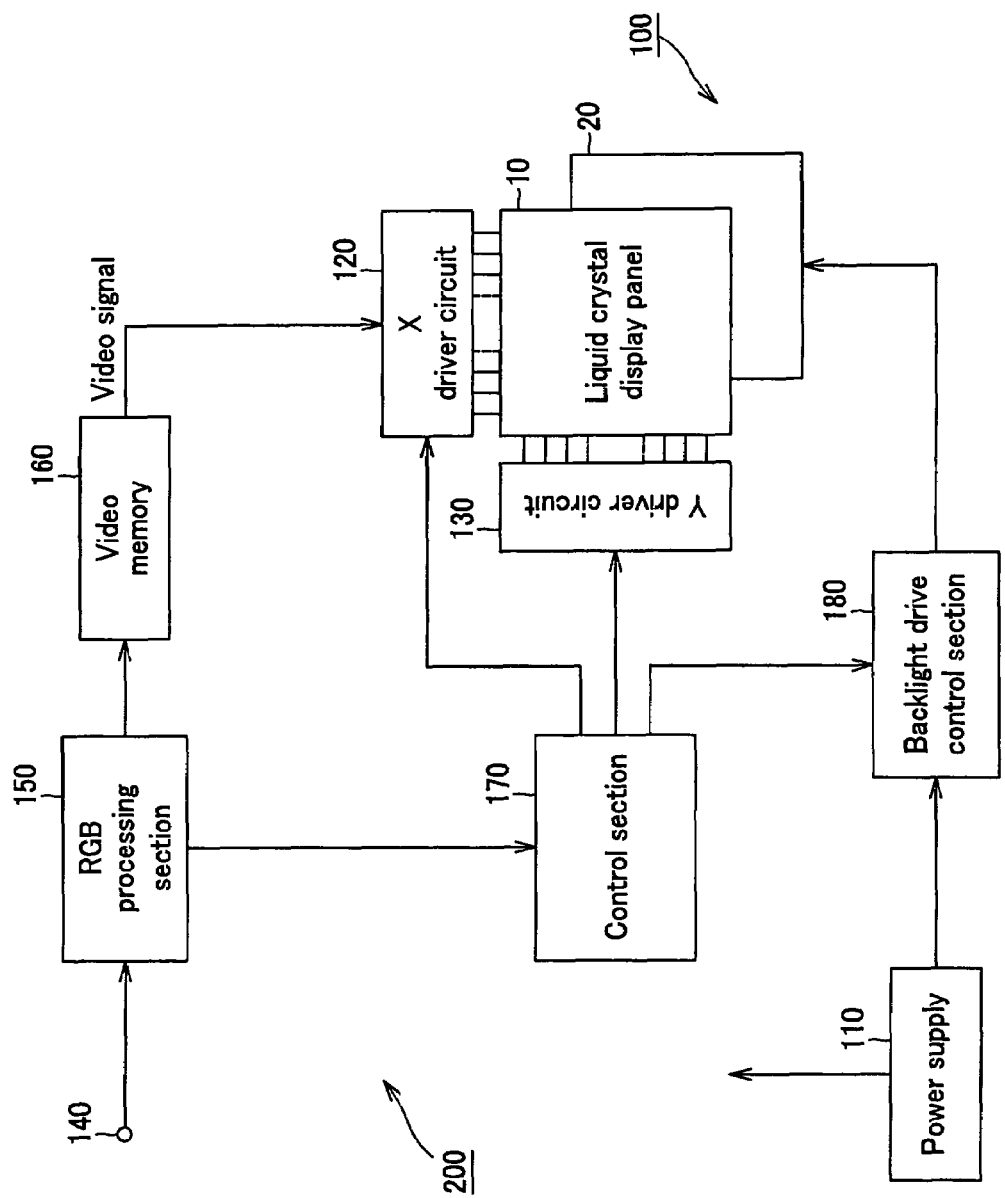
FIG. 4 is a block diagram showing a drive circuit of the liquid crystal display apparatus.

The liquid crystal display apparatus 100 is driven by a drive circuit 200 having the electrical block configuration as shown in FIG. 4, for example.

The drive circuit 200 comprises the following components. A power supply section 110 supplies power to drive the liquid crystal display panel 10 and the backlight apparatus 20. An X driver circuit 120 and a Y driver circuit 130 drive the liquid crystal display panel 10. An RGB processing section 150 is supplied with video signals from the outside via an input terminal 140. Video memory 160 and a control section 170 are connected to the RGB processing section 150. A backlight drive control section 180 drives and controls the backlight apparatus 20.

In the drive circuit 200, the RGB processing section 150 applies signal processes such as the chroma process to video signals supplied via the input terminal 140. A composite signal is converted into RGB separate signals suitable for driving the liquid crystal display panel 10. The RGB separate signals are supplied to the control section 170 and to the X driver circuit 120 via the video memory 160. The control section 170 controls the X driver circuit 120 and the Y driver circuit 130 at specified timings corresponding to the RGB separate signals. The RGB separate signals are supplied to the X driver circuit 120 via the video memory 160 and drive the liquid crystal display panel 10 to display videos corresponding to the RGB separate signals.

The following describes the backlight apparatus 20.

Figure 5:
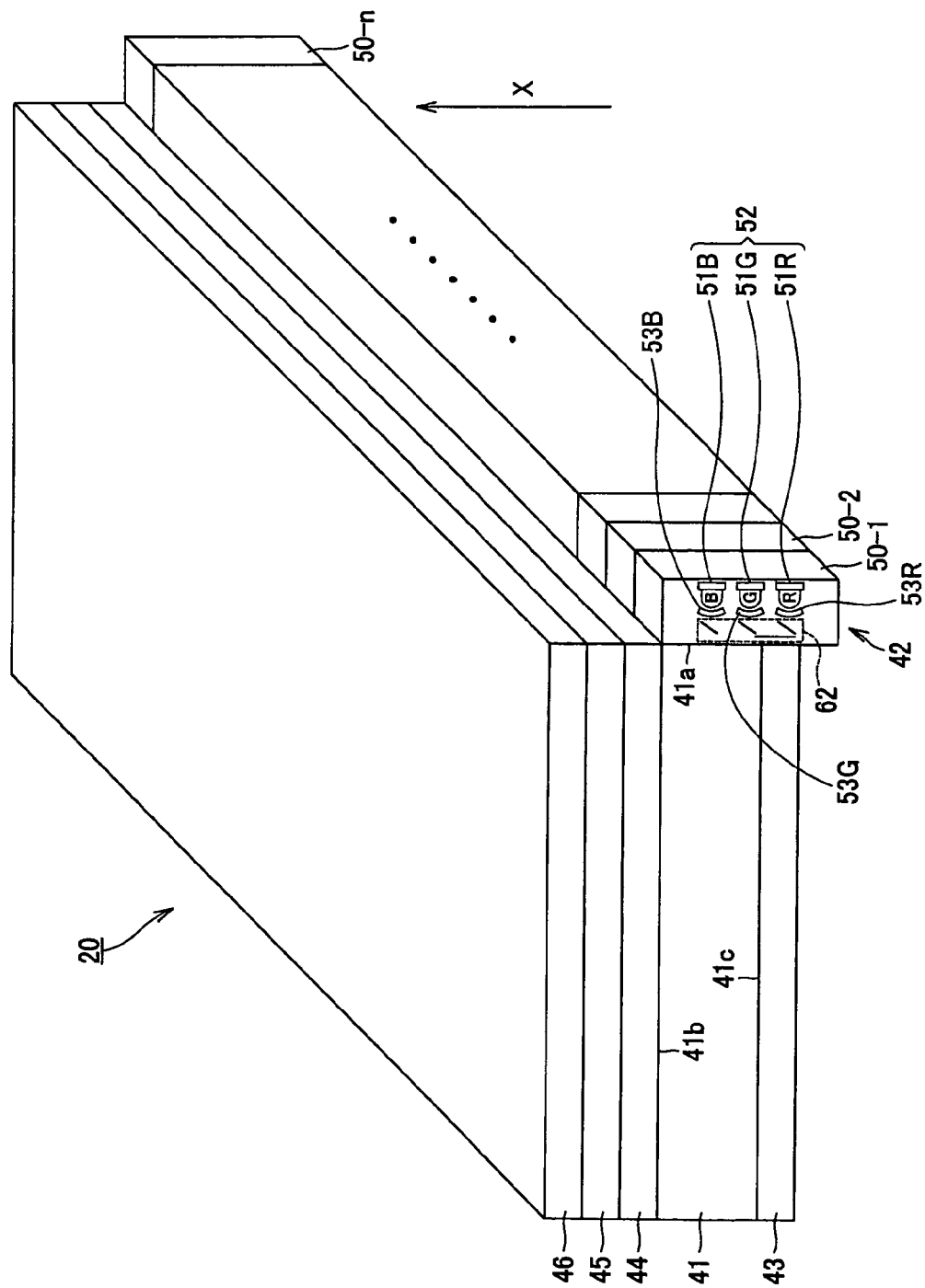
FIG. 5 is a perspective view showing a backlight apparatus according to the present invention.
Figure 6:
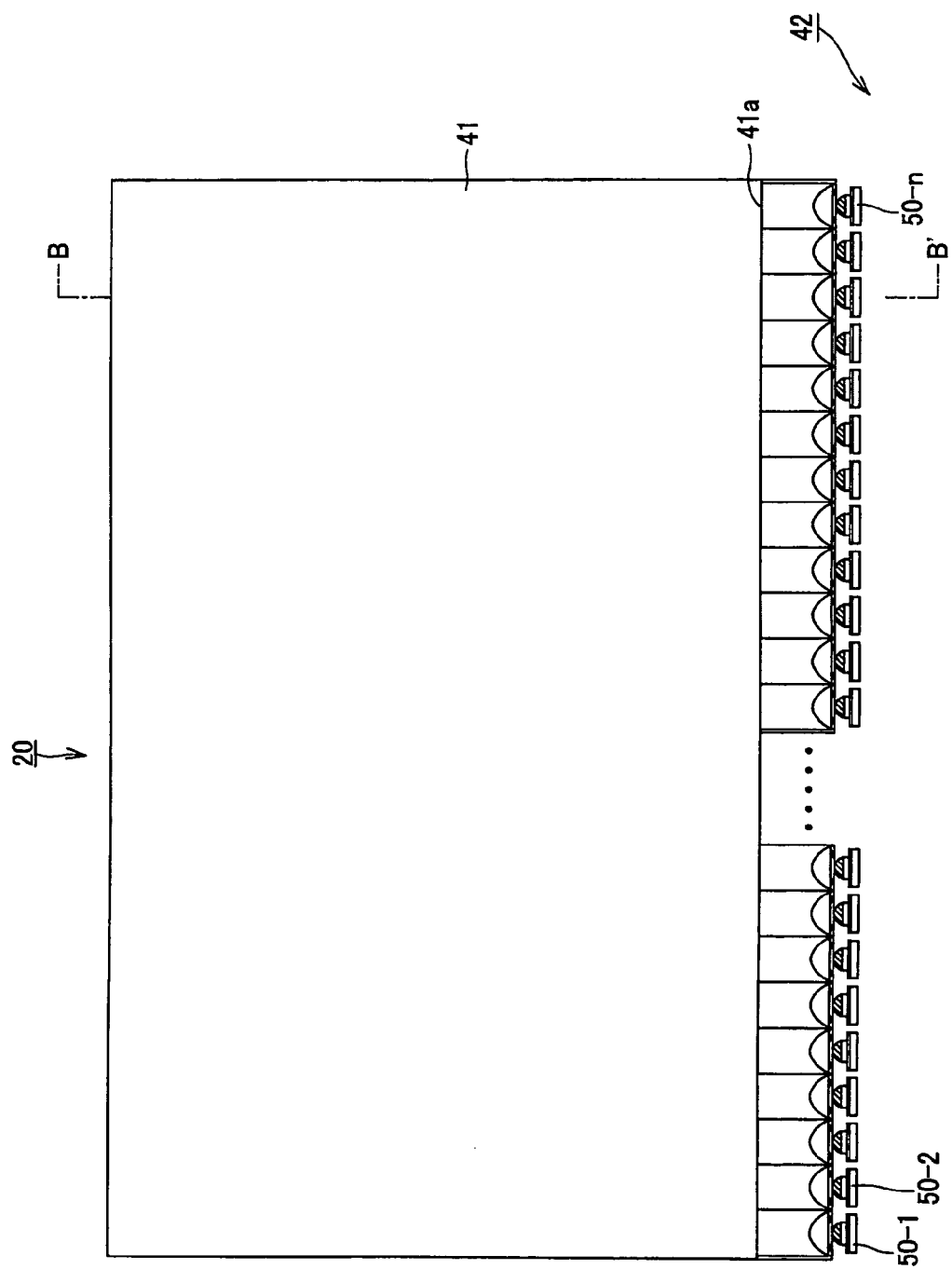
FIG. 6 is a plan view showing the backlight apparatus.

As shown in FIGS. 5 and 6, the backlight apparatus 20 comprises the following components. A light guiding plate 41 has a light incident surface 41a at one of edges in the width direction, a light emitting surface 41b corresponding to one principal surface, and a light reflecting surface 41c corresponding to the other principal surface. A light source section 42 is attached to the light incident surface 41a of the light guiding plate 41. A reflecting sheet 43 is placed on the light reflecting surface 41c of the light guiding plate 41. A diffusion sheet 44, a first lens sheet 45, and a second lens sheet 46 are provided in order on the light emitting surface 41b of the light guiding plate 41.

The light guiding plate 41 is a transparent flat plate having a specified thickness and is sized to fit to the liquid crystal display panel 10 to be illuminated. According to the embodiment, the light guiding plate 41 has an aspect ratio of 9:16, or the 23-inch size. The size of the light guiding plate 41 depends on the size of the liquid crystal display panel 10 to be illuminated and does not limit the present invention.

The light guiding plate 41 guides the light incident on the light incident surface 41a by means of the total reflection between the light emitting surface 41b and the light reflecting surface 41c and emits the light from the light emitting surface 41b. The light emitting surface 41b emits the light that enters the inside of the light emitting surface 41b at an angle smaller than the critical angle. The side of the light incident surface 41a becomes the bottom when the liquid crystal display apparatus 100 is placed.

The light guiding plate 41 is made of transparent thermoplastic resin such as acrylic, methacrylic, styrene, or polycarbonate resin. The light guiding plate 41 is formed by injection molding an acrylic resin, for example.

The light reflecting surface 41c of the light guiding plate 41 is formed with fine concavity and convexity, e.g., a prism pattern or a dot pattern. The pattern efficiently orients the light guided into the light guiding plate 41 toward the light emitting surface 41b. The light is oriented by the prism pattern or the dot pattern formed on the light reflecting surface 41c toward the light emitting surface 41b and is emitted as uniform light from the light emitting surface 41b. This causes surface emitting on the light guiding plate 41.

The light source section 42 is provided with a row of light source cells 50-1, 50-2, and 50-n (hereafter generically referred to as a light source cell 50 when no distinction is needed) to emit white light on the light incident surface 41a. According to the embodiment, n is set to 48.

Each white light emitted from each of the light source cells 50 enters each of the light incident surfaces 41a of the light guiding plate 41. The light is guided inside the light guiding plate 41 by means of the total reflection on the light emitting surface 41b or the light reflecting surface 41c. The light is oriented by the prism pattern or the dot pattern formed on the light reflecting surface 41c and is emitted from the light emitting surface 41b. The light source cell 50 and its arrangement will be described later in detail.

The light is guided in the light guiding plate 41 by means of the total reflection and may deviate from the light reflecting surface 41c outside the light guiding plate 41. The reflecting sheet 43 reflects the deviating light and returns it to inside the light guiding plate 41. This makes it possible to suppress light components that may be lost due to deviation from the light guiding plate 41 outward.

The diffusion sheet 44 uniformly diffuses the light emitted from the light emitting surface 41b of the light guiding plate 41 to uniform the in-plane strength of the white light emitted from the light emitting surface 41b of the light guiding plate 41. The first lens sheet 45 and the second lens sheet 46 control the light distribution so that the white light emitted from the diffusion sheet 44 converges in direction X (FIG. 5) perpendicular to the light emitting surface 41b.

Since the reflecting sheet 43, the diffusion sheet 44, the first lens sheet 45, and the second lens sheet 46 are arranged, the backlight apparatus 20 can illuminate the liquid crystal display panel 10 using the sufficiently bright light.

The following describes the configuration of the light source cell 50.

Figure 7:
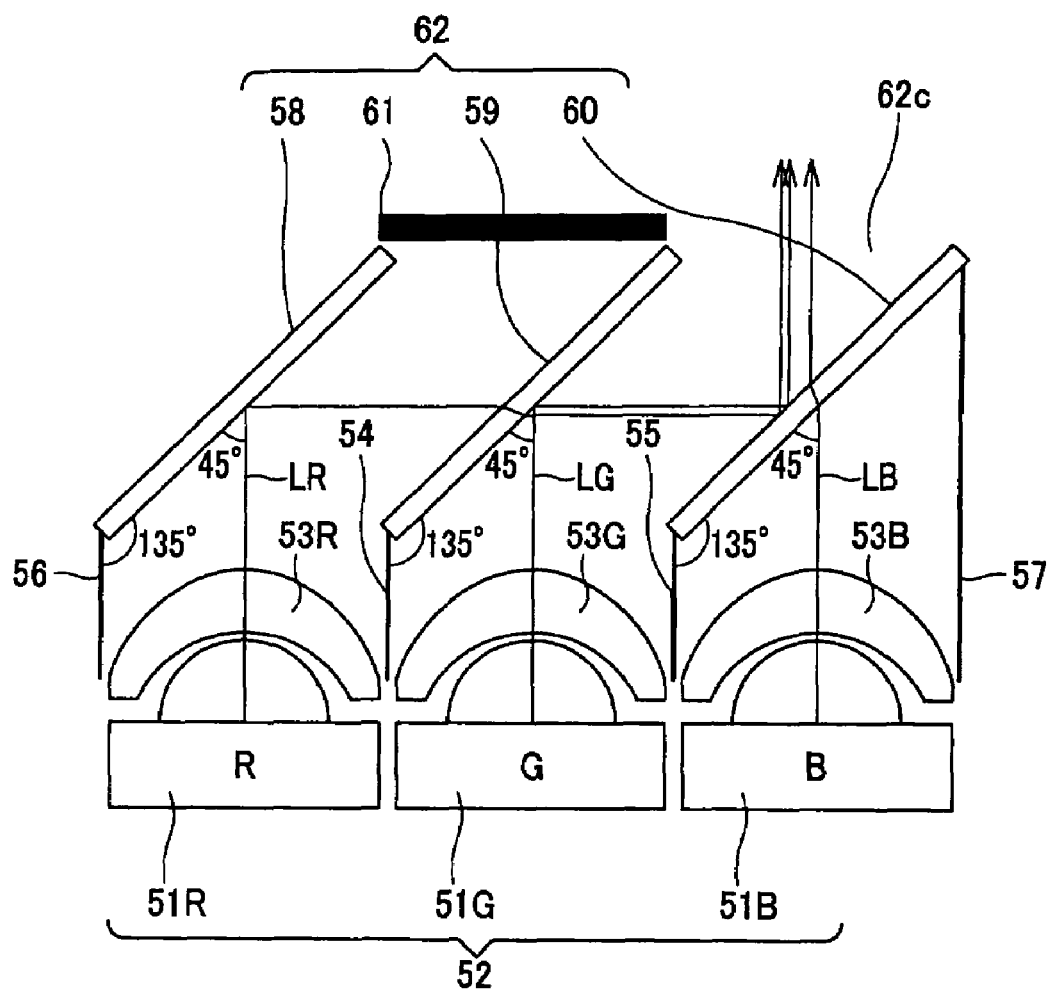
FIG. 7 is a plan view showing a light source cell provided for the backlight apparatus.

As shown in FIG. 7, the light source cell 50 includes a group of LEDs 52 provided with a row of a red LED (Light Emitting Diode) 51R to emit red light, a green LED 51G to emit green light, and a blue LED 51B to emit blue light. These LEDs are sequentially arranged in a row. The red LED 51R, the green LED 51G, and the blue LED 51B are respectively provided with, on their light emitting surface sides, a Fresnel lens 53R for the red light, a Fresnel lens 53G for the green light, and a Fresnel lens 53B for the blue light.

When no distinction is needed in the following description, the red LED 51R, the green LED 51G, and the blue LED 51B are generically referred to as a LED 51. The Fresnel lens 53R for the red light, the Fresnel lens 53G for the green light, and the Fresnel lens 53B for the blue light are generically referred to as a Fresnel lens 53.

The light source cell 50 comprises the following components. A first double-sided reflection mirror 54 is provided between the Fresnel lens 53R for the red light and the Fresnel lens 53G for the green light. A second double-sided reflection mirror 55 is provided between the Fresnel lens 53G for the green light and the Fresnel lens 53B for the blue light. A first reflection mirror 56 is provided on the side of the Fresnel lens 53R for the red light parallel to the first double-sided reflection mirror 54. A second reflection mirror 57 is provided on the side of the Fresnel lens 53B for the blue light parallel to the second double-sided reflection mirror 55.

The light source cell 50 further includes a color mixing section 62 that comprises the following components. A third reflection mirror 58 is provided on the light emitting surface side of the Fresnel lens 53R for the red light. A first beam splitter 59 is provided on the light emitting surface side of the Fresnel lens 53G for the green light. A second beam splitter 60 is provided on the light emitting surface side of the Fresnel lens 53B for the blue light. A fourth reflection mirror 61 is provided adjacent to one end of the third reflection mirror 58 and one end of the first beam splitter 59.

The Fresnel lens 53R for the red light refracts diffuse light contained in the red light emitted from the red LED 51R and emits parallel light to be incident on the third reflection mirror 58. The Fresnel lens 53G for the green light refracts diffuse light contained in the green light emitted from the green LED 51G and emits parallel light to be incident on the first beam splitter 59. The Fresnel lens 53B for the blue light refracts diffuse light contained in the blue light emitted from the blue LED 51B and emits parallel light to be incident on the second beam splitter 60.

The Fresnel lens 53 is used to transform the light emitted from each LED 51 into the parallel light. The red LED 51R, the green LED 51G, and the blue LED 51B respectively have optical axes LR, LG, and LB (hereafter generically referred to as an optical axis L when no distinction is needed) assumed to be set to 0°. The light emitted from the LED 51 travels in a direction 80° deviated from the optical axis. The light is introduced and can be fed to the color mixing section 62. The Fresnel lens 53 can be fabricated by injection molding resins such as polycarbonate. The use of the Fresnel lens 53 can reduce costs for the light source cell 50.

Mirrors are formed on both principal surfaces of the first and second double-sided reflection mirrors 54 and 55. Both principal surfaces reflect the incident light. One principal surface of the first double-sided reflection mirror 54 faces toward the red LED 51R. The other principal surface thereof faces toward the green LED 51G When the red light emitted from the Fresnel lens 53R for the red light is incident on one principal surface, the first double-sided reflection mirror 54 reflects the incident red light to feed it to the third reflection mirror 58. When the green light emitted from the Fresnel lens 53G for the green light is incident on the other principal surface, the first double-sided reflection mirror 54 reflects the incident green light to feed it to the first beam splitter 59.

One principal surface of the second double-sided reflection mirror 55 faces toward the green LED 51G. The other principal surface thereof faces toward the blue LED 51B. When the green light emitted from the Fresnel lens 53G for the green light is incident on one principal surface, the second double-sided reflection mirror 55 reflects the incident green light to feed it to the first beam splitter 59. When the blue light emitted from the Fresnel lens 53B for the blue light is incident on the other principal surface, the second double-sided reflection mirror 55 reflects the incident blue light to feed it to the second beam splitter 60.

The first reflection mirror 56 faces toward the red LED 51R and functions similarly to one principal surface of the first double-sided reflection mirror 54. When the red light emitted from the Fresnel lens 53R for the red light, the first reflection mirror 56 reflects the incident red light and feeds it to the third reflection mirror 58.

The second reflection mirror 57 faces toward the blue LED 51B and functions similarly to the other principal surface of the second double-sided reflection mirror 55. When the blue light emitted from the Fresnel lens 53B for the blue light, the second reflection mirror 57 reflects the incident blue light and feeds it to the second beam splitter 60.

The color mixing section 62 mixes the red light, the green light, and the blue light emitted from the LEDs 51 constituting the group of LEDs 52 to generate white light.

The third reflection mirror 58 for the color mixing section 62 is provided so as to be positioned 45° against the optical axis LR of the red LED 51R. The third reflection mirror 58 is provided so that its one end contacts the fourth reflection mirror 61 and the other end contacts the first reflection mirror 56. The third reflection mirror 58 receives the red light emitted via the Fresnel lens 53R for the red light or the red light reflected on the first reflection mirror 56 and one principal surface of the first double-sided reflection mirror 54. The third reflection mirror 58 refracts the incident red light and guides it to the first beam splitter 59.

The fourth reflection mirror 61 receives diffused red light, not parallel light, that is emitted from the Fresnel lens 53R for the red light and is not incident on the third reflection mirror 58. The fourth reflection mirror 61 reflects the incident red light and feeds it to the other principal surface of the first beam splitter 59.

The first beam splitter 59 is provided so as to be angled 45° against the optical axis LG of the green LED 51G and to be parallel to the third reflection mirror 58. The first beam splitter 59 is provided so that its one end contacts the fourth reflection mirror 61 and the other end contacts the first double-sided reflection mirror 54. One principal surface of the first beam splitter 59 receives the green light emitted via the Fresnel lens 53G for the green light or the green light reflected on the other principal surface of the first double-sided reflection mirror 54 and one principal surface of the second double-sided reflection mirror 55. The other principal surface of the first beam splitter 59 receives the red light reflected on the third reflection mirror 58 and the fourth reflection mirror 61. The first beam splitter 59 reflects the green light incident on one principal surface and transmits the red light incident on the other principal surface. In this manner, the first beam splitter 59 mixes the red light and the green light to generate yellow light and guides it to the second beam splitter 60.

The second beam splitter 60 is provided so as to be angled 45° against the optical axis LB of the blue LED 51B and to be parallel to the third reflection mirror 58 and the first beam splitter 59. The second beam splitter 60 is provided so that its one end contacts the second reflection mirror 57 and the other end contacts the second double-sided reflection mirror 55. One principal surface of the second beam splitter 60 receives the blue light emitted via the Fresnel lens 53B for the blue light or the blue light reflected on the other principal surface of the second double-sided reflection mirror 55 and one principal surface of the second reflection mirror 57. The other principal surface of the second beam splitter 60 receives the light guided by the first beam splitter 59. The second beam splitter 60 transmits the blue light incident on its one principal surface and reflects the light incident on the other principal surface. In this manner, the second beam splitter 60 mixes red, green, and blue lights to generate white light and emits it.

That is, in the color mixing section 62, the first beam splitter 59 mixes the red light and the green light to generate yellow light. The second beam splitter 60 then mixes the yellow light and the blue light to generate white light and emits it from a white light emission section 62a.

Figure 8:
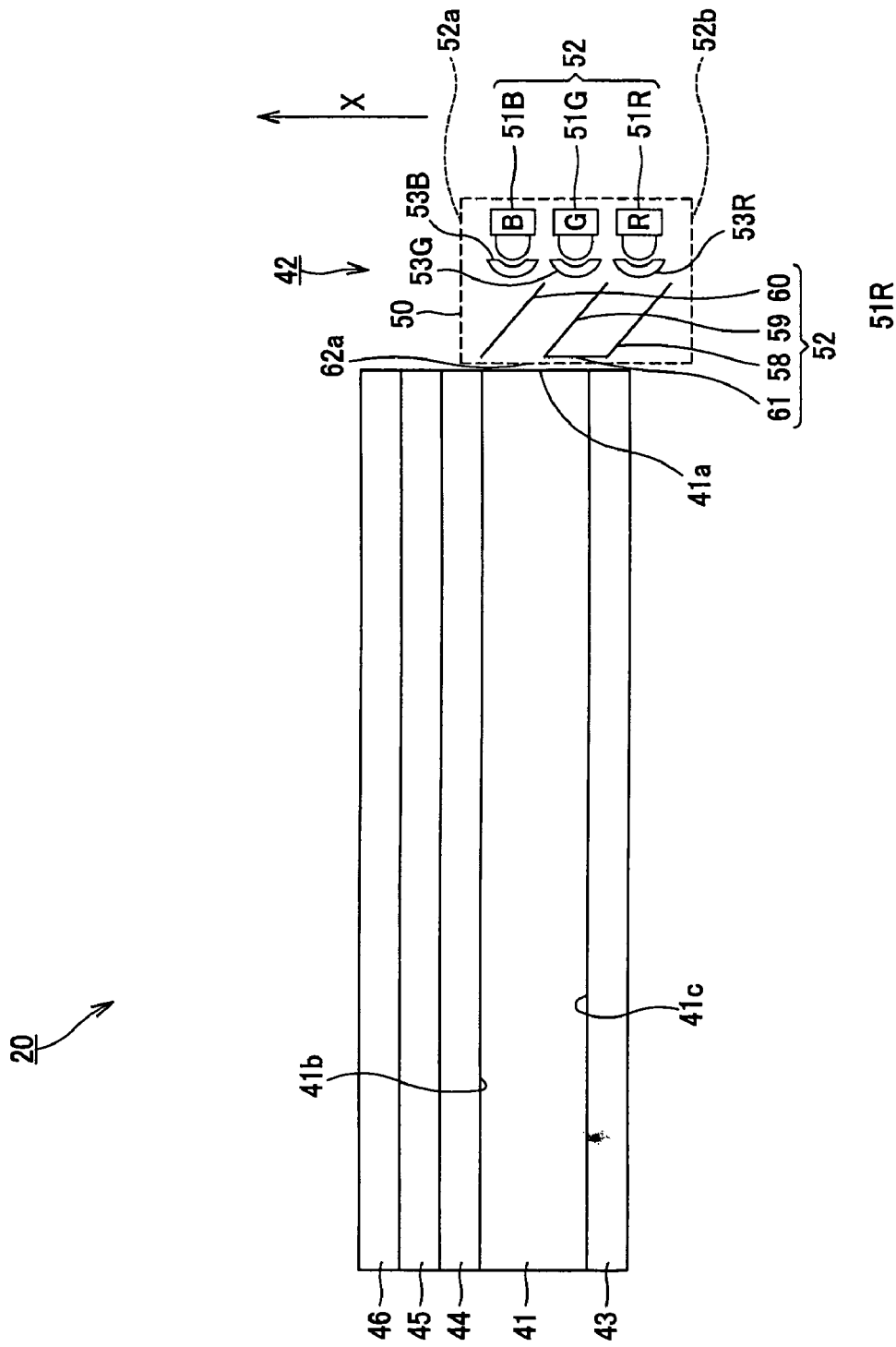
FIG. 8 is a sectional view showing the backlight apparatus.

As shown in FIG. 8, the above-mentioned light source cell 50 contains the red LED 51R, the green LED 51G, and the blue LED 51B mounted on the light incident surface 41a of the light guiding plate 41. The red LED 51R, the green LED 51, and the blue LED 51B are arranged perpendicularly to the light emitting surface 41b and the light reflecting surface 41c, i.e., in the direction indicated by an arrow X in FIG. 8. In other words, these LEDs are arranged so that both ends 52a and 52b of the LED group 52 in the longitudinal direction become parallel to the light emitting surface 41b and the light reflecting surface 41c. FIG. 8 is a cross sectional view of the backlight apparatus 20 taken along lines B-B' of FIG. 6. As shown in FIG. 6, the light source cells 50 are closely arranged so that the white light emission sections 62a are placed in a row on the light incident surface 41a.

The light source cell 50 is arranged perpendicularly to the light incident surface 41a of the light guiding plate 41. The red LED 51R the green LED 51G, and the blue LED 51B are arranged perpendicularly to the light emitting surface 41b. In this manner, the light incident surface 41a of the light guiding plate 41 can be provided with three times as many LEDs 51 as arranging the red LEDs 51R, the green LEDs 51G, and the blue LEDs 51B in a row.

Accordingly, the backlight apparatus 20 can allow the LEDs 51 to be arranged on only one side of the light guiding plate 41 and allow a large amount of white light to be fed to the light guiding plate 41. This facilitates wiring for connection between parts of the liquid crystal display apparatus 100 without crossing the LED 51. It becomes possible to avoid long or complicated wiring.

Figure 9:
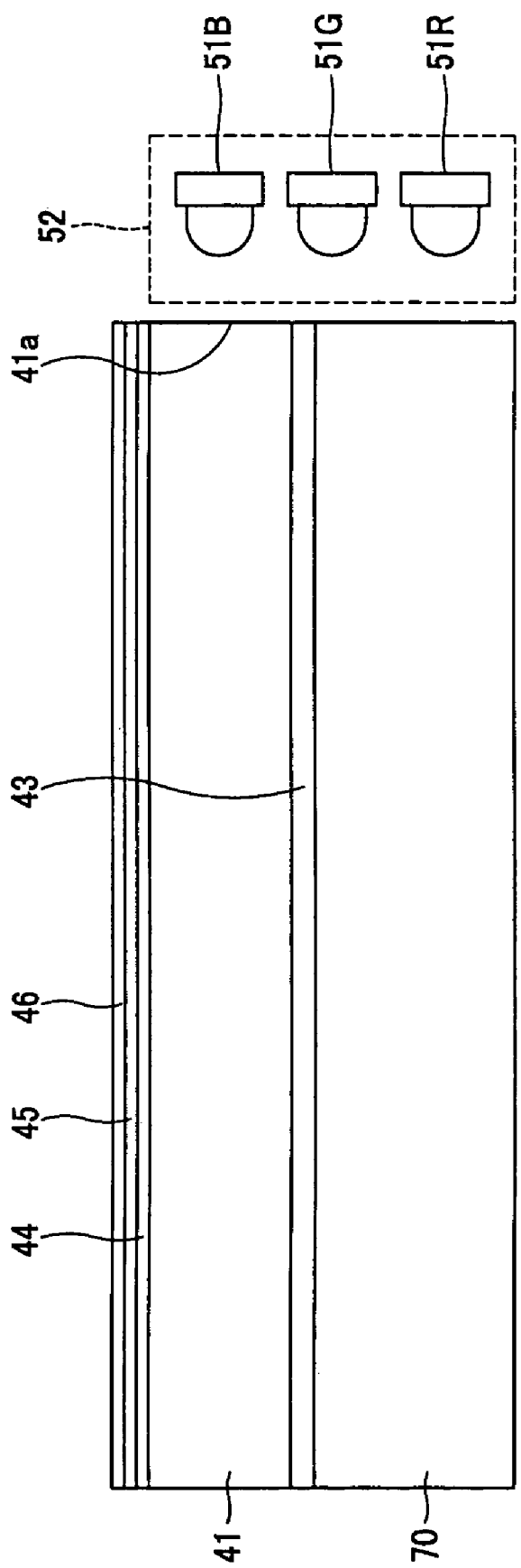
FIG. 9 is a schematic diagram illustrating the relationship between thicknesses of a light guiding plate and a heat sink layer and a length along the longitudinal direction of a light source group.

As shown in FIG. 9, the liquid crystal display apparatus 100 is provided with a heat sink layer 70 on the light reflecting surface 41c of the light guiding plate 41 to dissipate heat generated from the LED 51. In the backlight apparatus 20, it is desirable to arrange the red LED 51R, the green LED 51G, and the blue LED 53B in a row along the direction X so as to fit in a range covering the thickness of the light guiding plate 41 plus that of the heat sink layer 70. Since the LEDs 51 can be arranged in the arrow direction X in this case, it is possible to prevent the liquid crystal display apparatus 100 from being thickened.

The light source cell 50 emits white light composed of the red light, the green light, and the blue light mixed by the color mixing section 62 and feeds the white light to the light guiding plate 41. Accordingly, the backlight apparatus 20 can illuminate the liquid crystal display panel 10 with the white light generated by mixing the red, green, and blue lights without providing a space needed to mix these colors of light. Therefore, the backlight apparatus 20 can be easily designed to be low-profiled and small-sized.

Figure 10:
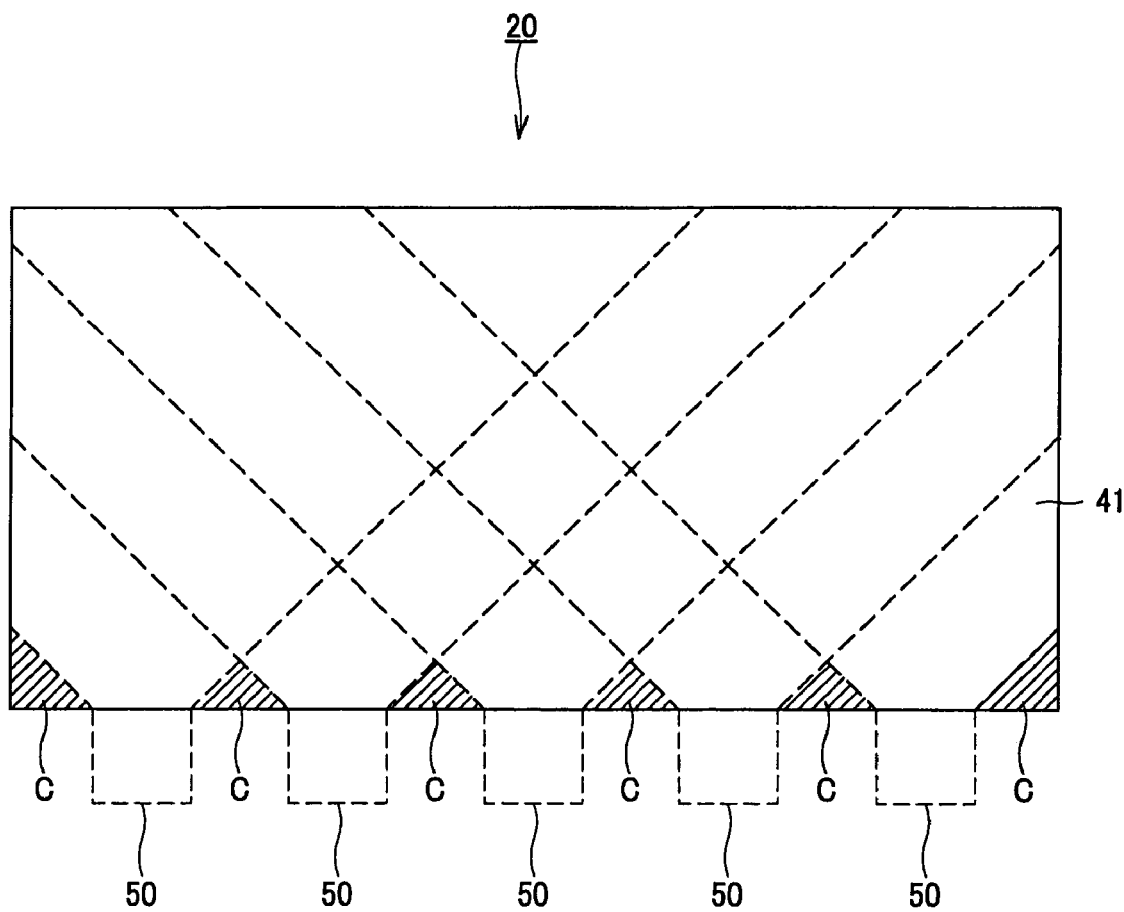

Since the light source cells 50 are closely arranged so that the white light emission sections 62a are aligned in a row, there is little gap between the white light emission sections 62a. A gap between the white light emission sections 62a, if any, produces a region as indicated by C in FIG. 10 that inhibits the white light emitted from the white light emission section 62a from passing through. It becomes difficult to uniform the in-plane strength of the light emitted from the light emitting surface 41b of the light guiding plate 41. Consequently, it becomes difficult to emit the light with the uniform in-plane strength from the backlight apparatus 20. When the light source cells 50 are arranged so as to align the white light emission sections 62a in a row, it becomes possible to easily uniform the in-plane strength of the light emitted from the backlight apparatus 20.

Figure 11A:
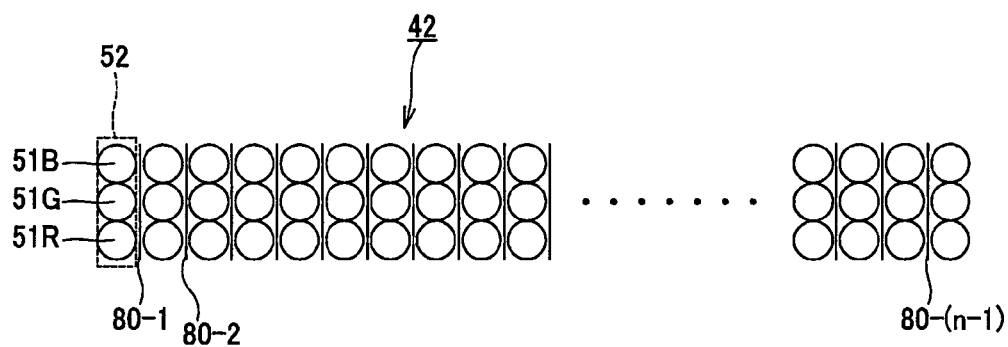
FIG. 11 is a pattern diagram showing an integrally formed light source cell.
Figure 11B:
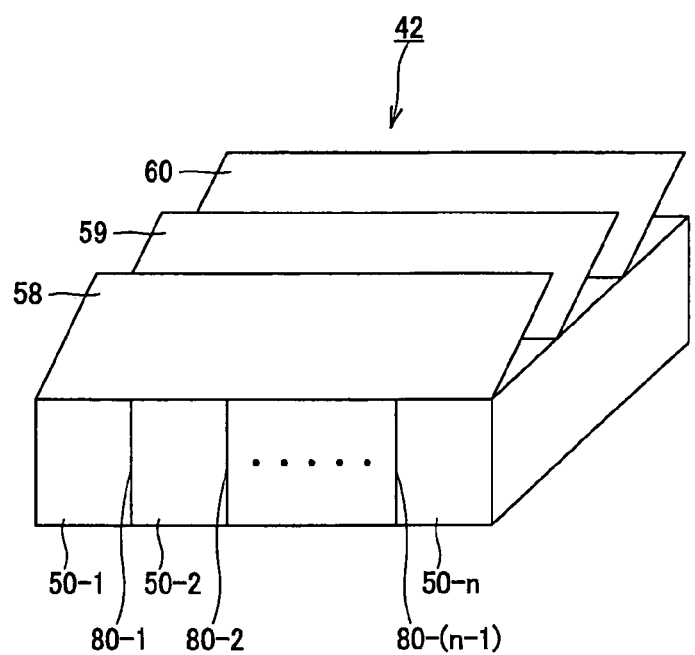

As shown in FIGS. 11A and 11B, it is desirable to integrally form each light source cell 50. In more detail, the LED group 52 is arranged so that the red LED 51R, the green LED 51G, and the blue LED 51B are aligned in a row as shown in FIG. 11A. The LED groups 52 are partitioned with sheet metals 80-1, 80-2, . . . , and 80-(n−1) to integrally form the third reflection mirror 58, and the first and second beam splitters 59 and 60 as shown in FIG. 11B.

Such construction can decrease the number of parts constituting the light source section 42 and facilitate its fabrication. Since the first and second beam splitters 59 and 60 are integrally formed, it is unnecessary to finely cut the first and second beam splitters 59 and 60 to the size of the light source cell 50. As a result, the light source section 42 can be easily fabricated.

Further, it may be preferable to integrally form the first and second double-sided reflection mirrors 54 and 55 and the first, second, and fourth reflection mirrors 56, 57, and 59 provided for each light source cell 50. In this case, it is also unnecessary to finely cut the first and second double-sided reflection mirrors 54 and 55 and the first, second, and fourth reflection mirrors 56, 57, and 59 to the size of the light source cell 50. The light source section 42 can be more easily fabricated.

Figure 12:
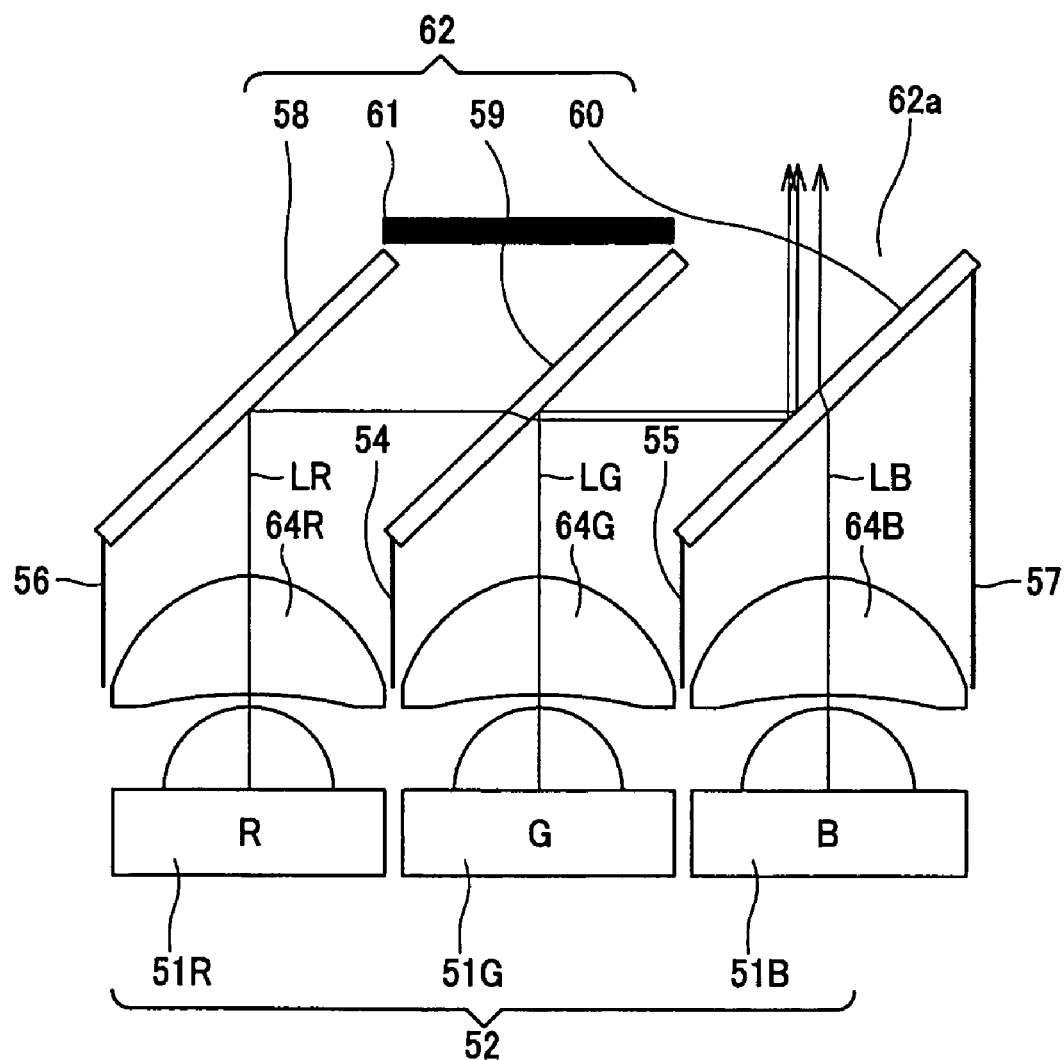
FIG. 12 is a plan view showing a light source cell having an aspherical lens.

The light source cell 50 may be provided with spherical lenses or aspherical lenses 64R, 64G, and 64B as shown in FIG. 12 instead of the Fresnel lens 53. Provision of the spherical lenses or aspherical lenses 64R, 64G, and 64B can easily avoid light reflection due to the Fresnel surface.

Figure 13:
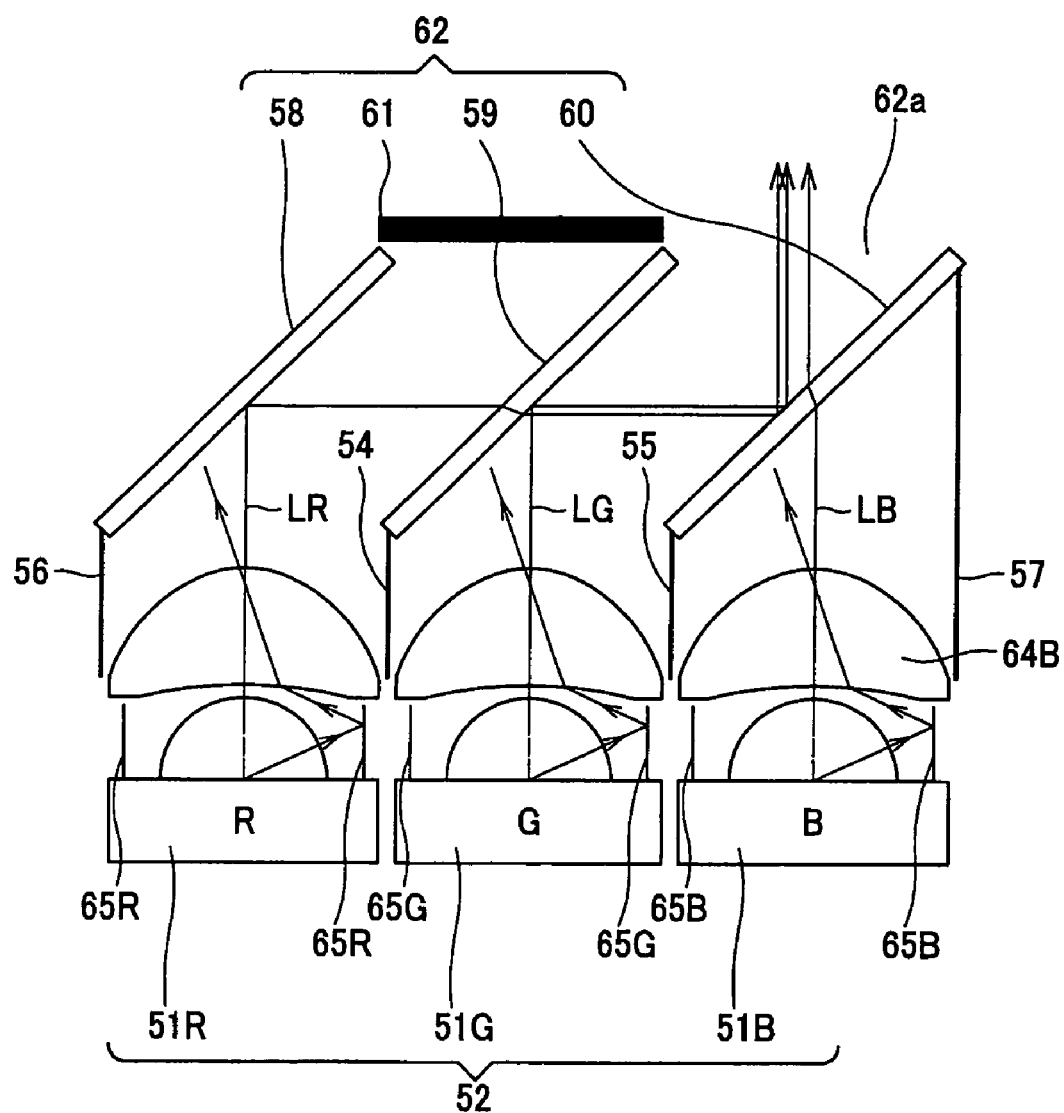
FIG. 13 is a plan view showing a light source cell having an aspherical lens and a reflecting plate between light emitting diodes.

When the spherical lenses or aspherical lenses 64R, 64G, and 64B are provided instead of the Fresnel lens 53, it is preferable to provide reflecting plates 65R, 65G, and 65B on the sides of the red LED 51R, the green LED 51G, and the blue LED 51B, respectively, as shown in FIG. 13.

The spherical lenses make it difficult to introduce light traveling in a direction 50° or more deviated from the optical axis L when assuming that the optical axis L of the LED 51 is set to 0°. The aspherical lenses 64R, 64G, and 64B make it difficult to introduce light traveling in a direction 60° or more deviated from the optical axis L when assuming that the optical axis L of the LED 51 is set to 0°. Accordingly, the spherical lenses or the aspherical lenses 64R, 64G, and 64B make it difficult to efficiently allow the light emitted from the LED 51 to enter the color mixing section 62.

When the reflecting plates 65R, 65G, and 65B are provided on the sides of the red LED 51R, the green LED 51G, and the blue LED 51B, the reflecting plates reflect light not incident on the spherical lenses or the aspherical lenses 64R, 64G, and 64B. This makes it possible to allow the reflected light to enter the spherical lenses or the aspherical lenses 64R, 64G, and 64B, and then the color mixing section 62. Even when the spherical lenses or the aspherical lenses 64R, 64G, and 64B are provided, the light source cell 50 can efficiently use the light emitted from the LEDs 51.

Figure 14:
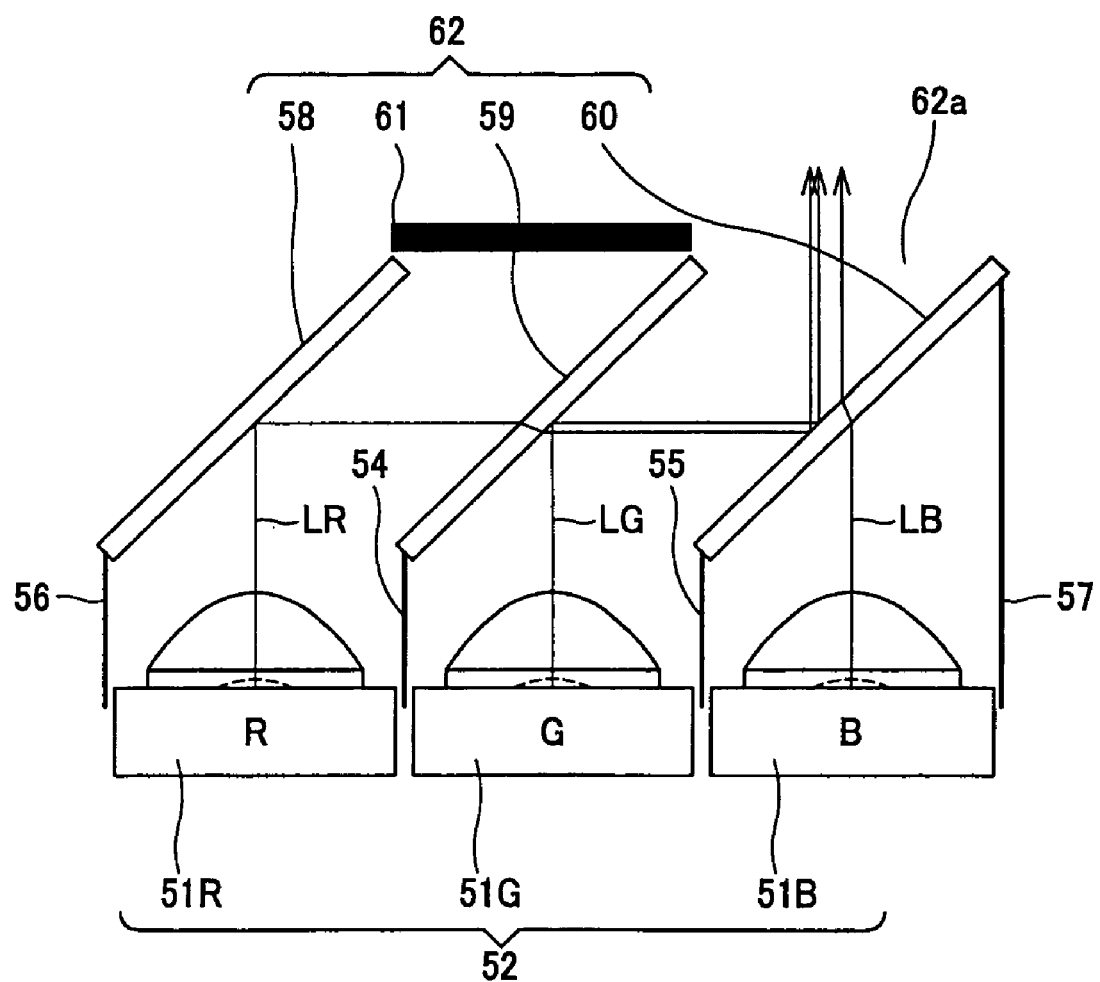
FIG. 14 is a plan view showing a light source cell having a light emitting diode so designed as to emit parallel light from a lens provided to a light emitting section.

The light source cell 50 may use appropriately designed lenses provided on the light emitting section of the LED 51 as shown in FIG. 14 so that parallel light can be emitted from the LEDs 51 and directly enter the color mixing section 62. In this case, the Fresnel lenses 53 or the aspherical lenses 64 need not be provided on the light emitting side of the LED 51. Such configuration can decrease the number of parts constituting the light source cell 50 and miniaturize it.

As mentioned above, the backlight apparatus 20 according to the present invention is provided with the red LEDs 51R, the green LEDs 51G, and the blue LEDs 51B arranged on the light incident surface 41a of the specifically sized light guiding plate 41. The number of these LEDs can be increased three times as many as arranging the equivalent LEDs in a row. Accordingly, it is possible to feed a large amount of white light having high color purity to the light guiding plate 41. It is possible to supply the light guiding plate 41 with a large amount of white light having high color purity from one side. The backlight apparatus 20 according to the present invention is a side-edge type backlight using the LED 51 as a light source. The backlight apparatus 20 can emit light having sufficient brightness and high color purity to illuminate the liquid crystal display panel 10.

In the backlight apparatus 20 according to the present invention, the color mixing section 62 provided for the light source cell 50 mixes red, green, and blue lights to generate white light that is then incident on the light guiding plate 41. Since there is no need for a space to mix red, green, and blue lights, the backlight apparatus 20 can be designed to have a low profile.

The backlight apparatus 20 according to the present invention uses the LED 51 as a light source, and therefore promotes safety and decreases adverse effects on the environment.

The low-profile edge-lit backlight apparatus 20 emits white light that results from mixing red, green, and blue lights and exhibits sufficient brightness and high color purity. The liquid crystal display apparatus 100 according to the present invention uses such backlight apparatus 20 to illuminate the liquid crystal display panel 10. Accordingly, the liquid crystal display apparatus 100 according to the present invention can have a low profile and clearly represent video displayed on the liquid crystal display panel 10.

The liquid crystal display apparatus 100 according to the present invention is equipped with the backlight apparatus 20 using the LED 51 as the light source, and therefore promotes safety and decreases adverse effects on the environment.

It should be understood by those skilled in the art that various modifications, combinations, sub-combinations and alterations may occur depending on design requirements and other factors insofar as they are within the scope of the appended claims or the equivalents thereof.

What is claimed is:

1. A backlight apparatus comprising:
   a light guiding plate which guides light introduced from a light incident side by utilizing total reflection on a light emitting surface as one principal surface and a light reflecting surface as another principal surface and emits light from the light emitting surface based on said surface emitting; and
   a plurality of white light emission units for emitting white light incident on the light guiding plate,
   wherein,
   each white light emission unit includes:
      a light source group of a first light emitting diode to emit first primary color light,
      a second light emitting diode to emit second primary color light,
      a third light emitting diode to emit third primary color light which are arranged in a row, and
      a color mixing unit for generating white light by mixing the first primary color light emitted from the first light emitting diode, the second primary color light emitted from the second light emitting diode, and the third primary color light emitted from the third light emitting diode,
   on the light incident side of the light guiding plate, the first light emitting diode, the second light emitting diode, and the third light emitting diode are aligned in a direction perpendicular to one of the principal surfaces of the light guiding plate, and the color mixing unit included in the white light emission unit comprises a first reflecting plate having a light reflecting surface to reflect the first primary color light emitted through a first lens, a first beam splitter plate having a first wavelength-selective transmitting and reflecting surface which transmits the first primary color light reflected on a light reflecting surface of the first reflecting plate and reflects the second primary color light emitted through a second lens, a second reflecting plate adjacent to one end of the first reflecting plate and to one end of the first beam splitter plate and having a light reflecting plate to reflect a diffused portion of the first primary color light to the first beam splitter plate, and a second beam splitter plate having a second wavelength-selective transmitting and reflecting surface to reflect the first primary color light and the second primary color light emitted through the first beam splitter plate and to transmit the third primary color light emitted through a third lens, and generating white light by mixing the first primary color light, the second primary color light, and the third primary color light.

2. The backlight apparatus according to claim 1, wherein each white light emission unit is arranged on the light incident side along a longitudinal direction of the light guiding plate.

3. The backlight apparatus according to claim 1, wherein the first reflecting plate, the first beam splitter plate, and the second beam splitter plate are integrally formed.

4. The backlight apparatus according to claim 1, wherein each one of the white light emission units comprises:
   a first lens to generate a first parallel light by refracting a first diffuse light contained in the first primary color light emitted from the first light emitting diode;
   a second lens to generate a second parallel light by refracting a second diffuse light contained in the second primary color light emitted from the second light emitting diode; and
   a third lens to generate a third parallel light by refracting diffuse a third light contained in the third primary color light emitted from the third light emitting diode.

5. The backlight apparatus according to claim 4, wherein the first, second, and third lenses are Fresnel lenses.

6. The backlight apparatus according to claim 4, wherein the first, second, and third lenses are spherical or aspherical condenser lenses.

7. A liquid crystal display apparatus comprising a transmissive liquid crystal panel and a backlight apparatus to illuminate the liquid crystal panel from one principal surface, wherein,
   the backlight apparatus comprises:
      a light guiding plate which guides light introduced from a light incident side by utilizing total reflection on a light emitting surface as one principal surface and a light reflecting surface as another principal surface and emits light from the light emitting surface based on surface emitting; and
      a plurality of white light emission units for emitting white light incident on the light guiding plate,
   wherein,
      the white light emission means includes:
         a light source group of a first light emitting diode to emit first primary color light,
         a second light emitting diode to emit second primary color light,
         a third light emitting diode to emit third primary color light which are arranged in a row,
         a color mixing unit for generating white light by mixing the first primary color light emitted from the first light emitting diode, the second primary color light emitted from the second light emitting diode, and the third primary color light emitted from the third light emitting diode,
      on the light incident side of the light guiding plate, the first light emitting diode, the second light emitting diode, and the third light emitting diode are aligned in a direction perpendicular to one of the principal surfaces of the light guiding plate, and
      the color mixing unit included in the white light emission unit comprises a first reflecting plate having a light reflecting surface to reflect the first primary color light emitted through a first lens, a first beam splitter plate having a first wavelength-selective transmitting and reflecting surface which transmits the first primary color light reflected on a light reflecting surface of the first reflecting plate and reflects the second primary color light emitted through a second lens, a second reflecting plate adjacent to one end of the first reflecting plate and to one end of the first beam splitter plate and having a light reflecting plate to reflect a diffused portion of the first primary color light to the first beam splitter plate, and a second beam splitter plate having a second wavelength-selective transmitting and reflecting surface to reflect the first primary color light and the second primary color light emitted through the first beam splitter plate and to transmit the third primary color light emitted through a third lens, and generating white light by mixing the first primary color light, the second primary color light, and the third primary color light.

8. The liquid crystal display apparatus according to claim 7, wherein the white light emission means is arranged on the light incident side along a longitudinal direction of the light guiding plate.

9. The liquid crystal display apparatus according to claim 7, wherein the plurality of color mixing unit include the first reflecting plate, the first beam splitter plate, and the second beam splitter plate that are integrally formed.

10. The liquid crystal display apparatus according to claim 7, wherein each one of the white light emission units comprises:
   a first lens to generate a first parallel light by refracting a first diffuse light contained in the first primary color light emitted from the first light emitting diode;
   a second lens to generate a second parallel light by refracting a second diffuse light contained in the second primary color light emitted from the second light emitting diode; and
   a third lens to generate a third parallel light by refracting a third diffuse light contained in the third primary color light emitted from the third light emitting diode.

11. The liquid crystal display apparatus according to claim 10, wherein the first, second, and third lenses are Fresnel lenses.

12. The liquid crystal display apparatus according to claim 10, wherein the first, second, and third lenses are spherical or aspherical condenser lenses.

13. A backlight apparatus comprising:
   a light guiding plate which guides light introduced from a light incident side by utilizing total reflection on a light emitting surface as one principal surface and a light reflecting surface as the other principal surface and emits light from the light emitting surface based on surface emitting; and a plurality of white light emission sections that emit white light incident on the light guiding plate, wherein, the white light emission section includes:

a light source group of a first light emitting diode to emit first primary color light, a second light emitting diode to emit second primary color light, and a third light emitting diode to emit third primary color light which are arranged in a row, a color mixing section that generates white light by mixing the first primary color light emitted from the first light emitting diode, the second primary color light emitted from the second light emitting diode, and the third primary color light emitted from the third light emitting diode, on the light incident side of the light guiding plate, the first light emitting diode, the second light emitting diode, and the third light emitting diode are aligned in a direction perpendicular to one of the principal surfaces of the light guiding plate, and the color mixing unit included in the white light emission unit comprises a first reflecting plate having a light reflecting surface to reflect the first primary color light emitted through a first lens, a first beam splitter plate having a first wavelength-selective transmitting and reflecting surface which transmits the first primary color light reflected on a light reflecting surface of the first reflecting plate and reflects the second primary color light emitted through a second lens, a second reflecting plate adjacent to one end of the first reflecting plate and to one end of the first beam splitter plate and having a light reflecting plate to reflect a diffused portion of the first primary color light to the first beam splitter plate, and a second beam splitter plate having a second wavelength-selective transmitting and reflecting surface to reflect the first primary color light and the second primary color light emitted through the first beam splitter plate and to transmit the third primary color light emitted through a third lens, and generating white light by mixing the first primary color light, the second primary color light, and the third primary color light.

14. A liquid crystal display apparatus comprising a transmissive liquid crystal panel and a backlight apparatus to illuminate the liquid crystal panel from one principal surface, wherein the backlight apparatus comprises:

a light guiding plate which guides light introduced from a light incident side by means of total reflection on a light emitting surface as one principal surface and a light reflecting surface as the other principal surface and emits light from the light emitting surface based on surface emitting; and a plurality of white light emission sections that emit white light incident on the light guiding plate, wherein, the white light emission section includes:

a light source group of a first light emitting diode to emit first primary color light, a second light emitting diode to emit second primary color light, and a third light emitting diode to emit third primary color light which are arranged in a row; and a color mixing section that generates white light by mixing the first primary color light emitted from the first light emitting diode, the second primary color light emitted from the second light emitting diode, and the third primary color light emitted from the third light emitting diode; and on the light incident side of the light guiding plate, the first light emitting diode, the second light emitting diode, and the third light emitting diode are aligned in a direction perpendicular to one of the principal surfaces of the light guiding plate, and the color mixing unit included in the white light emission unit comprises a first reflecting plate having a light reflecting surface to reflect the first primary color light emitted through a first lens, a first beam splitter plate having a first wavelength-selective transmitting and reflecting surface which transmits the first primary color light reflected on a light reflecting surface of the first reflecting plate and reflects the second primary color light emitted through a second lens, a second reflecting plate adjacent to one end of the first reflecting plate and to one end of the first beam splitter plate and having a light reflecting plate to reflect a diffused portion of the first primary color light to the first beam splitter plate, and a second beam splitter plate having a second wavelength-selective transmitting and reflecting surface to reflect the first primary color light and the second primary color light emitted through the first beam splitter plate and to transmit the third primary color light emitted through a third lens, and generating white light by mixing the first primary color light, the second primary color light, and the third primary color light.

* * * * *